J. DITTMAR.
FISH GRIP.
APPLICATION FILED FEB. 2, 1911.
1,006,367.
Patented Oct. 17, 1911.
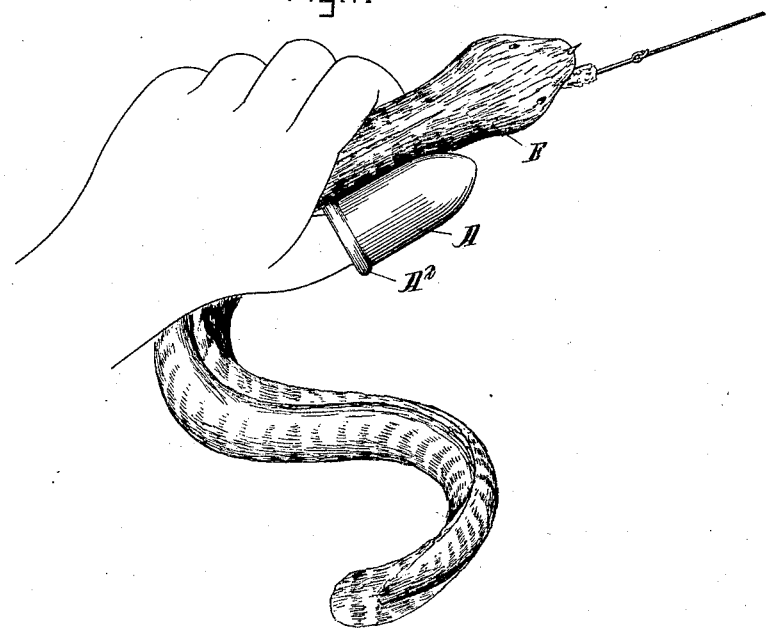
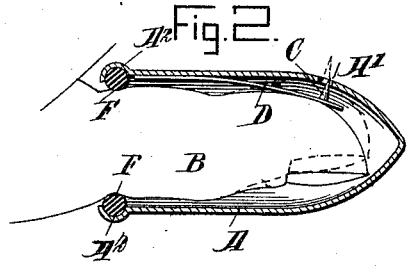
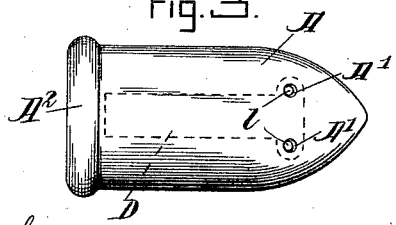
WITNESSES
INVENTOR
John Dittmar
BY
ATTORNEYS

UNITED STATES PATENT OFFICE.

JOHN DITTMAR, OF NEW YORK, N. Y.

FISH-GRIP.

1,006,367. Specification of Letters Patent. Patented Oct. 17, 1911.

Application filed February 2, 1911. Serial No. 606,118.

*To all whom it may concern:*

Be it known that I, JOHN DITTMAR, a citizen of the United States, and a resident of the city of New York, borough of Brooklyn, in the county of Kings and State of New York, have invented a new and Improved Fish-Grip, of which the following is a full, clear, and exact description.

The object of the invention is to provide a new and improved fish grip for the use of fishermen, fish dealers and other persons, and arranged to permit of obtaining a firm hold on a live fish when taking it off the fish hook or out of a net, or for holding a fish for scaling, cleaning or other purposes.

For the purpose mentioned use is made of a thimble adapted to be worn upon a person's finger, and provided with pins capable of projecting from the face of the thimble for engagement with the fish.

A practical embodiment of the invention is represented in the accompanying drawings forming a part of this specification, in which similar characters of reference indicate corresponding parts in all the views.

Figure 1 is a perspective view of the fish grip as applied; Fig. 2 is an enlarged sectional plan view of the same; and Fig. 3 is a side elevation of the same.

A thimble A adapted to be worn upon the thumb or other finger B is provided near its tip with one or more apertures A' for the passage of pins C, secured on the free end of a flat spring B secured to the thimble A at the inside thereof, as plainly indicated in Fig. 2. A spring D normally holds the pins C in a retracted position, so that the points of the pins C do not project beyond the outer face of the thimble A, but when the thimble A is worn upon a person's finger B and a pressure is exerted by the finger against the free end of the spring D, then the spring D is pressed outwardly and the pins C project beyond the outer face of the thimble A so as to readily engage the fish E with a view to obtain a firm hold of a live fish when taking it off a fish hook or out of a net, or for holding a fish for scaling, cleaning or other purposes.

In the entrance end of the thimble A is arranged a ring F, of rubber or other suitable elastic material, held in place in an annular bead $A^2$ formed on the entrance end of the thimble A. The ring F encircles and clampingly engages the finger B near the base end thereof, so that the forward portion of the finger B is free to readily press the spring D for projecting the pins C, as previously explained. When the fish grip is not in use the pins C are held in retracted position by the action of the spring D, so that the thimble can be conveniently carried in a pocket without danger of tearing the lining thereof.

Having thus described my invention, I claim as new and desire to secure by Letters Patent:

1. A fish grip, comprising a thimble adapted to be worn upon a person's finger and provided with pins normally concealed within the thimble and adapted to be projected from the face of the thimble.

2. A fish grip, comprising a thimble adapted to be worn upon a person's finger and provided with pins normally concealed within the thimble and adapted to be projected from the face of the thimble, and a retaining means within the thimble at the entrance end thereof for engaging the finger to hold the thimble firmly in place on the finger.

3. A fish grip, comprising a thimble adapted to be worn upon a person's finger and provided with pins, and an elastic ring held in the thimble at the entrance end thereof and adapted to encircle and clampingly engage the finger.

4. A fish grip, comprising a thimble adapted to be worn upon a person's finger and provided with pins normally concealed within the thimble and adapted to be projected from the face of the thimble, and an elastic ring held in the entrance end of the thimble and adapted to encircle and clampingly engage the finger.

5. A fish grip, comprising a thimble provided with holes near the top of the thimble, a spring inside the thimble and secured at one end to the thimble, and pins on the free end of the spring and adapted to pass through the said holes.

6. A fish grip, comprising a thimble provided with holes near the top of the thimble, a spring inside the thimble and secured at one end to the thimble, pins on the free end of the spring and adapted to pass through the said holes, and a rubber ring held in the entrance end of the thimble.

In testimony whereof I have signed my name to this specification in the presence of two subscribing witnesses.

JOHN DITTMAR.

Witnesses:
 THEO. G. HOSTER,
 PHILIP D. ROLLHAUS.